(12) United States Patent
Upadhya et al.

(10) Patent No.: US 12,362,818 B2
(45) Date of Patent: Jul. 15, 2025

(54) RELAYING COMMUNICATIONS WITH MOBILE OBJECTS

(71) Applicant: NOKIA TECHNOLOGIES OY, Espoo (FI)

(72) Inventors: Karthik Upadhya, Espoo (FI); Mikko Aleksi Uusitalo, Helsinki (FI); Martti Johannes Moisio, Klaukkala (FI); Tero Johannes Ihalainen, Nokia (FI); Dani Johannes Korpi, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 287 days.

(21) Appl. No.: 17/763,990

(22) PCT Filed: Sep. 21, 2020

(86) PCT No.: PCT/FI2020/050603
§ 371 (c)(1),
(2) Date: Mar. 25, 2022

(87) PCT Pub. No.: WO2021/058860
PCT Pub. Date: Apr. 1, 2021

(65) Prior Publication Data
US 2022/0352973 A1 Nov. 3, 2022

(30) Foreign Application Priority Data
Sep. 25, 2019 (FI) ...................................... 20195814

(51) Int. Cl.
*H04B 7/00* (2006.01)
*H01Q 3/00* (2006.01)
(Continued)

(52) U.S. Cl.
CPC ......... *H04B 7/15507* (2013.01); *H01Q 3/005* (2013.01); *H04B 7/15528* (2013.01);
(Continued)

(58) Field of Classification Search
None
See application file for complete search history.

(56) References Cited

U.S. PATENT DOCUMENTS 7,095,376 B1 * 8/2006 Timothy ................ H01Q 1/125
343/705
9,590,298 B1    3/2017 Buchmueller et al.
(Continued)

FOREIGN PATENT DOCUMENTS

CN   102111844 A   6/2011
CN   108615346 B   10/2018
(Continued)

OTHER PUBLICATIONS

Extended European Search Report mailed on Mar. 11, 2024 for EP20867752.6.
(Continued)

*Primary Examiner* — Gerald A Smarth
(74) *Attorney, Agent, or Firm* — Kramer & Amado, P.C.

(57) ABSTRACT

An apparatus is disclosed, the apparatus comprising a means for receiving selection of a relay system associated with a base station (10) of a communications network, the relay system comprising a first antenna (15) for substantially fixed orientation towards an antenna (12) of the base station and a second antenna (16) which is mechanically movable about one or more axes responsive to the control data to provide one of a range of possible orientations. The apparatus may also comprise a means for sending control data to the selected relay system for controlling the orientation of the second antenna, the control data comprising at least positioning instructions received from a node of the communications network for causing positioning of the second antenna to a particular orientation associated with a mobile target object (19).

21 Claims, 6 Drawing Sheets

(51) Int. Cl.
 *H04B 7/155* (2006.01)
 *H04B 7/185* (2006.01)
 *H04B 7/26* (2006.01)
 *H01Q 3/12* (2006.01)
(52) U.S. Cl.
 CPC .......... *H04B 7/18506* (2013.01); *H04B 7/26* (2013.01); *H01Q 3/12* (2013.01)

(56) References Cited

U.S. PATENT DOCUMENTS

| | | |
|---|---|---|
| 9,836,049 B1 | 12/2017 | Tu |
| 2012/0230247 A1 | 9/2012 | Kwon |
| 2016/0269132 A1 | 9/2016 | Clark et al. |
| 2016/0315392 A1 | 10/2016 | Tanabe |
| 2018/0375569 A1* | 12/2018 | Mesnager .......... H04B 7/18513 |
| 2019/0363779 A1* | 11/2019 | Chae .................. H04W 8/005 |
| 2020/0292691 A1* | 9/2020 | Kintz ................. G01S 13/4445 |

FOREIGN PATENT DOCUMENTS

| | | |
|---|---|---|
| EP | 3399666 A1 | 11/2018 |
| JP | 6498326 B1 | 4/2019 |
| JP | 2019125877 A | 7/2019 |
| WO | 2018163991 A1 | 9/2018 |
| WO | 2019/061224 A1 | 4/2019 |

OTHER PUBLICATIONS

European Search Report for EP 20867752.6 mailed on Sep. 28, 2023.
First Office Action for CN 202080081760.3 mailed on Oct. 16, 2023.
Office Action issued for corresponding Chinese Patent Application 202080081760.3 dated Apr. 26, 2024.

* cited by examiner

RELAYING COMMUNICATIONS WITH MOBILE OBJECTS

FIELD

Example embodiments relate to systems, methods and computer programs for relaying communications with mobile objects.

BACKGROUND

In some situations, it may be required to perform wireless communications with one or more mobile objects. In this context, a mobile object is an object that is not usually fixed and which may change position. As an example, unmanned aerial vehicles (UAVs), or drones, are used for various applications, and their use is likely to increase to the extent that they may become key enablers for future technologies and applications. For example, UAVs may comprise one or more sensors, such as a camera, to assist in emergency response applications and/or to deliver vital supplies.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

One aspect of the invention provides an apparatus, comprising means for: receiving selection of a relay system associated with a base station of a communications network, the relay system comprising a first antenna for substantially fixed orientation towards an antenna of the base station and a second antenna which is mechanically movable about one or more axes responsive to the control data to provide one of a range of possible orientations; and sending control data to the selected relay system for controlling the orientation of the second antenna, the control data comprising at least positioning instructions received from a node of the communications network for causing positioning of the second antenna to a particular orientation associated with a mobile target object.

The positioning instructions may comprise or resolve to azimuth and elevation angles. The apparatus may be in signal communication with the base station, and wherein the one or more positioning instructions are received from said base station. The apparatus may comprise the base station, and wherein the one or more positioning instructions are received from another node of the communications network in signal communication with the base station. The apparatus may further comprise means for sending status data received from the relay system to the, or another node of the communications network, the status data indicating a one or more status parameters of the relay system indicative of whether the relay system is available to relay signals between the base station and the mobile target object. The apparatus may further comprise means to request the status data from the relay system. The request may specify one or more particular status parameters to be received from the relay system. The status parameters may comprise one or more of an indication as to whether the relay system is currently busy or available; a current orientation of the second antenna; a power status of the relay system. The apparatus may further comprise means for sending capability data received from the relay system to the, or another node of the communications network, the capability data indicating a one or more characteristics of the relay system. The capability data may comprise an indication of a range of possible orientations that the second antenna of the relay system can be moved to using control data. The capability data may further comprise an identifier associated with the relay system to distinguish it from one or more other relay systems. The capability data may further comprise the slew rate of the second antenna, indicative of the maximum rate of angular change that the second antenna can be moved by using control data. The capability data may further comprise one or more frequency bands supported by the apparatus. The capability data may further comprise the spatial resolution of the second antenna. The capability data may further comprise an indication of the power source type used by the relay. The apparatus and the relay system may communicate wirelessly using WiFi (IEEE 802.11) and wherein the control data may be transmitted over a WiFi channel.

The apparatus may further comprising means for: sending to a node of the communications network a determination as to whether one or more relay systems associated with the base station is or are available for relaying signals between the base station and a particular mobile target object. The apparatus may further comprise means for sending a predetermined radius $\gamma_{BS}$ associated with the base station to the network node indicative of a coverage area within which one or more available relay systems may be located. The apparatus may further comprise means for broadcasting to the mobile target object, or causing broadcasting via the base station, a signal indicative of a positive or negative determination as to whether one or more candidate relay systems associated with the or another base station are available. The broadcasting means may use a PBCH channel in which the positive or negative determination is reflected in a single bit attached to a PBCH message. The apparatus may further comprise means for sending status data to the network node responsive to receiving a request for said status data from the network node. The received request for said status data may comprise one or more single-bit flags in a predetermined order, indicative of one or more status parameters being requested from the network node.

The apparatus may further comprise means for receiving position data from the mobile target object for sending to the network node. The apparatus may further comprise means for receiving waypoint data from the mobile target object for sending to the network node. The apparatus may further comprise means for receiving, from the network node, control data indicative of an orientation, or range of orientations to scan through, for each of the one or more available relay systems. The apparatus may further comprise means for initiating measurement indicative of a quality of service (QoS) between the second antenna of each of the one or more candidate relay systems and the mobile target object when at the orientation, or within the range of orientations indicated in the control data. The apparatus may further comprise means for sending the QoS measurements for the or each candidate relay system to the network node. The apparatus may further comprise means for receiving selection of an optimal relay system from the network node and sending a further control signal to said selected optimal relay system for using said relay system to relay signals between the base station and the mobile target object.

According to another aspect, there may be provided an apparatus, comprising means for communicating wirelessly with one or more associated relay control systems, each relay control system being associated with a relay system comprising a first antenna for substantially fixed orientation towards an antenna of the base station and a second antenna which is mechanically movable about one or more axes to provide one of a range of possible orientations; sending an identifier of the apparatus to a node of a communications network; and receiving in reply a determination as to whether one or more relay systems associated with the apparatus is or are available for relaying signals between the apparatus and a mobile target object.

The apparatus may further comprise means for sending a predetermined radius $\gamma_{BS}$ associated with the apparatus to the network node indicative of a coverage area within which one or more available relay systems may be located. The apparatus may further comprise means for broadcasting to the mobile target object, or causing broadcasting via the apparatus, a signal indicative of a positive or negative determination as to whether one or more relay systems associated with the apparatus are available.

The broadcasting means may use a PBCH channel in which the positive or negative determination is reflected in a single bit attached to a PBCH message. The apparatus may further comprise means for sending status data to the network node responsive to receiving a request for said status data from the network node. The received request for said status data may comprise one or more single-bit flags in a predetermined order, indicative of one or more status parameters being requested from the network node. The apparatus may further comprise means for receiving position data from the mobile target object for sending to the network node.

The apparatus may further comprise means for receiving waypoint data from the mobile target object for sending to the network node. The apparatus may further comprise means for receiving, from the network node, control data indicative of an orientation, or range of orientations to scan through, for each of the one or more available relay systems. The apparatus may further comprise means for initiating measurement indicative of a quality of service (QoS) between the second antenna of each of the one or more candidate relay systems and the mobile target object when at the orientation, or within the range of orientations indicated in the control data. The apparatus may further comprise means for sending the QoS measurements for the or each candidate relay system to the network node. The apparatus may further comprise means for receiving selection of an optimal relay system from the network node and sending a further control signal to said selected optimal relay system for using said relay system to relay signals between the base station and the mobile target object.

The apparatus may comprise a base station of a cellular communications network.

The network node may comprise part of a core telecommunications network.

According to another aspect, there may be provided an apparatus, comprising means for: determining an availability of a plurality of relay systems associated with one or more base stations of a communications network; determining selection of one of the available relay systems as being optimal for relaying signals between a mobile target object and its associated base station based on one or more criteria; and; transmitting control data to the selected relay system comprising at least positioning instructions for causing positioning of the second antenna to a particular orientation associated with the mobile target object.

Availability may be determined based on data received from the one or more base stations, wherein the means may be further configured to: receive a predetermined radius $\gamma_{BS}$ associated with the respective one or more base stations and indicative of a coverage area within which one or more available relay systems may be located. The apparatus may further comprise means for receiving position data from the mobile target object. The apparatus may further comprise means for receiving waypoint data from the mobile target object for sending to the network node. The apparatus may further comprise means for generating initial control data indicative of an orientation, or range of orientations to scan through, for each of the one or more available relay systems. The apparatus may further comprise means for initiating measurements indicative of a quality of service (QoS) between a movable antenna of each of the one or more available relay systems and the mobile target object when at the orientation, or within the range of orientations, indicated in the initial control data. The apparatus may further comprise determining the selection of one of the available relay systems as being optimal and/or the particular orientation based on the measurements.

According to another aspect, there may be provided a method comprising: receiving selection of a relay system associated with a base station of a communications network, the relay system comprising a first antenna for substantially fixed orientation towards an antenna of the base station and a second antenna which is mechanically movable about one or more axes responsive to the control data to provide one of a range of possible orientations; and sending control data to the selected relay system for controlling the orientation of the second antenna, the control data comprising at least positioning instructions received from a node of the communications network for causing positioning of the second antenna to a particular orientation associated with a mobile target object.

The positioning instructions may comprise or resolve to azimuth and elevation angles. The one or more positioning instructions may be received from the base station. The one or more positioning instructions may be received from a node of the communications network in signal communication with the base station. The method may further comprise sending status data received from the relay system to the, or another node of the communications network, the status data indicating a one or more status parameters of the relay system indicative of whether the relay system is available to relay signals between the base station and the mobile target object. The method may further comprise requesting the status data from the relay system. The request may specify one or more particular status parameters to be received from the relay system. The status parameters may comprise one or more of an indication as to whether the relay system is currently busy or available, a current orientation of the second antenna and a power status of the relay system. The method may further comprise sending capability data received from the relay system to the, or another node of the communications network, the capability data indicating a one or more characteristics of the relay system. The capability data may comprise an indication of a range of possible orientations that the second antenna of the relay system can be moved to using control data. The capability data may further comprise an identifier associated with the relay system to distinguish it from one or more other relay systems. The capability data may further comprise the slew rate of the second antenna, indicative of the maximum rate of angular change that the second antenna can be moved by using control data. The capability data may further comprise one or more frequency bands supported by the apparatus. The capability data may further comprise the spatial resolution of the second antenna. The capability data may further comprise an indication of the power source type used by the relay. Communication with the relay system may be performed wirelessly using WiFi (IEEE 802.11) and wherein the control data is transmitted over a WiFi channel.

The method may further comprise sending to a node of the communications network a determination as to whether one or more relay systems associated with the base station is or are available for relaying signals between the base station and a particular mobile target object.

The method may further comprise sending a predetermined radius $\gamma_{BS}$ associated with the base station to the network node indicative of a coverage area within which one or more available relay systems may be located.

The method may further comprise broadcasting to the mobile target object, or causing broadcasting via the base station, a signal indicative of a positive or negative determination as to whether one or more candidate relay systems associated with the or another base station are available.

Broadcasting may use a PBCH channel in which the positive or negative determination is reflected in a single bit attached to a PBCH message.

The method may further comprise sending status data to the network node responsive to receiving a request for said status data from the network node. The received request for said status data may comprise one or more single-bit flags in a predetermined order, indicative of one or more status parameters being requested from the network node.

The method may further comprise receiving position data from the mobile target object for sending to the network node.

The method may further comprise receiving waypoint data from the mobile target object for sending to the network node.

The method may further comprise receiving, from the network node, control data indicative of an orientation, or range of orientations to scan through, for each of the one or more available relay systems.

The method may further comprise initiating measurement indicative of a quality of service (QoS) between the second antenna of each of the one or more candidate relay systems and the mobile target object when at the orientation, or within the range of orientations indicated in the control data.

The method may further comprise sending the QoS measurements for the or each candidate relay system to the network node.

The method may further comprise receiving selection of an optimal relay system from the network node and sending a further control signal to said selected optimal relay system for using said relay system to relay signals between the base station and the mobile target object.

According to another aspect, there may be provided a method, comprising: communicating wirelessly with one or more associated relay control systems, each relay control system being associated with a relay system comprising a first antenna for substantially fixed orientation towards an antenna of the base station and a second antenna which is mechanically movable about one or more axes to provide one of a range of possible orientations; sending an identifier of the apparatus to a node of a communications network; receiving in reply a determination as to whether one or more relay systems associated with an apparatus is or are available for relaying signals between the apparatus and a mobile target object.

The method may further comprise sending a predetermined radius $\gamma_{BS}$ associated with the apparatus to the network node indicative of a coverage area within which one or more available relay systems may be located. The method may further comprise broadcasting to the mobile target object, or causing broadcasting via the apparatus, a signal indicative of a positive or negative determination as to whether one or more relay systems are available. Broadcasting may use a PBCH channel in which the positive or negative determination is reflected in a single bit attached to a PBCH message. The method may further comprise sending status data to the network node responsive to receiving a request for said status data from the network node. The received request for said status data may comprise one or more single-bit flags in a predetermined order, indicative of one or more status parameters being requested from the network node. The method may further comprise receiving position data from the mobile target object for sending to the network node. The method may further comprise receiving waypoint data from the mobile target object for sending to the network node. The method may further comprise receiving, from the network node, control data indicative of an orientation, or range of orientations to scan through, for each of the one or more available relay systems.

The method may further comprise initiating measurement indicative of a quality of service (QoS) between the second antenna of each of the one or more candidate relay systems and the mobile target object when at the orientation, or within the range of orientations indicated in the control data. The method may further comprise sending the QoS measurements for the or each candidate relay system to the network node. The method may further comprise receiving selection of an optimal relay system from the network node and sending a further control signal to said selected optimal relay system for using said relay system to relay signals between the base station and the mobile target object.

The method may be performed at a base station of a cellular communications network. The network node may comprise part of a core telecommunications network.

According to another aspect, there may be provided a method, comprising: determining an availability of a plurality of relay systems associated with one or more base stations of a communications network; determining selection of one of the available relay systems as being optimal for relaying signals between a mobile target object and its associated base station based on one or more criteria; and; transmitting control data to the selected relay system comprising at least positioning instructions for causing positioning of the second antenna to a particular orientation associated with the mobile target object.

Availability may be determined based on data received from the one or more base stations, wherein the means is further configured to: receive a predetermined radius $\gamma_{BS}$ associated with the respective one or more base stations and indicative of a coverage area within which one or more available relay systems may be located. The method may further comprise receiving position data from the mobile target object. The method may further comprise receiving waypoint data from the mobile target object for sending to the network node. The method may further comprise generating initial control data indicative of an orientation, or range of orientations to scan through, for each of the one or more available relay systems. The method may further comprise initiating measurements indicative of a quality of service (QoS) between a movable antenna of each of the one or more available relay systems and the mobile target object when at the orientation, or within the range of orientations, indicated in the initial control data. The method may further comprise determining the selection of one of the available relay systems as being optimal and/or the particular orientation based on the measurements.

According to another aspect, there may be provided an apparatus comprising at least one processor, at least one memory directly connected to the at least one processor, the at least one memory including computer program code, and the at least one processor, with the at least one memory and the computer program code being arranged to perform the method of any preceding definition.

According to another aspect, there may be provided a computer program product comprising a set of instructions which, when executed on an apparatus, is configured to cause the apparatus to carry out the method of any preceding definition.

According to another aspect, there may be provided a non-transitory computer readable medium comprising program instructions stored thereon for performing a method, comprising: receiving selection of a relay system associated with a base station of a communications network, the relay system comprising a first antenna for substantially fixed orientation towards an antenna of the base station and a second antenna which is mechanically movable about one or more axes responsive to the control data to provide one of a range of possible orientations; and sending control data to the selected relay system for controlling the orientation of the second antenna, the control data comprising at least positioning instructions received from a node of the communications network for causing positioning of the second antenna to a particular orientation associated with a mobile target object.

According to another aspect, there may be provided an apparatus comprising: at least one processor; and at least one memory including computer program code which, when executed by the at least one processor, causes the apparatus: to receive selection of a relay system associated with a base station of a communications network, the relay system comprising a first antenna for substantially fixed orientation towards an antenna of the base station and a second antenna which is mechanically movable about one or more axes responsive to the control data to provide one of a range of possible orientations; and to send control data to the selected relay system for controlling the orientation of the second antenna, the control data comprising at least positioning instructions received from a node of the communications network for causing positioning of the second antenna to a particular orientation associated with a mobile target object.

According to another aspect, there may be provided a non-transitory computer readable medium comprising program instructions stored thereon for performing a method, comprising: communicating wirelessly with one or more associated relay control systems, each relay control system being associated with a relay system comprising a first antenna for substantially fixed orientation towards an antenna of the base station and a second antenna which is mechanically movable about one or more axes to provide one of a range of possible orientations; sending an identifier of the apparatus to a node of a communications network; receiving in reply a determination as to whether one or more relay systems associated with an apparatus is or are available for relaying signals between the apparatus and a mobile target object.

According to another aspect, there may be provided an apparatus comprising: at least one processor; and at least one memory including computer program code which, when executed by the at least one processor, causes the apparatus: to communicate wirelessly with one or more associated relay control systems, each relay control system being associated with a relay system comprising a first antenna for substantially fixed orientation towards an antenna of the base station and a second antenna which is mechanically movable about one or more axes to provide one of a range of possible orientations; to send an identifier of the apparatus to a node of a communications network; to receive in reply a determination as to whether one or more relay systems associated with an apparatus is or are available for relaying signals between the apparatus and a mobile target object.

According to another aspect, there may be provided a non-transitory computer readable medium comprising program instructions stored thereon for performing a method, comprising:
determining an availability of a plurality of relay systems associated with one or more base stations of a communications network; determining selection of one of the available relay systems as being optimal for relaying signals between, i.e. to and/or from, a mobile target object and its associated base station based on one or more criteria; and transmitting control data to the selected relay system comprising at least positioning instructions for causing positioning of the second antenna to a particular orientation associated with the mobile target object.

According to another aspect, there may be provided an apparatus comprising: at least one processor; and at least one memory including computer program code which, when executed by the at least one processor, causes the apparatus: to determine an availability of a plurality of relay systems associated with one or more base stations of a communications network; to determine selection of one of the available relay systems as being optimal for relaying signals between a mobile target object and its associated base station based on one or more criteria; and; to transmit control data to the selected relay system comprising at least positioning instructions for causing positioning of the second antenna to a particular orientation associated with the mobile target object.

According to an aspect of the invention there is provided a method for communicating with a mobile target object having the steps of: receiving selection of a relay system associated with a base station of a communications network; the relay system having a first antenna for substantially fixed orientation towards an antenna of the base station, and a second antenna which is mechanically movable about one or more axes responsive to the control data to provide one of a range of possible orientations; and sending control data to the selected relay system for controlling the orientation of the second antenna, the control data comprising at least positioning instructions received from a node of the communications network for causing positioning of the second antenna to a particular orientation associated with a mobile target object.

In one embodiment of this invention the positioning instructions comprise or resolve to azimuth and elevation angles.

According to another embodiment of this aspect of the invention, there is the further step of sending status data received from the relay system to the node of the communications network or another node of the communications network, the status data indicating a one or more status parameters of the relay system indicative of whether the relay system is available to relay signals between the base station and the mobile target object. In some of these embodiments the status parameters includes at least one of: an indication as to whether the relay system is currently busy or available, a current orientation of the second antenna, or a power status of the relay system.

According to another embodiment of this aspect of the invention, there is the further step of sending capability data received from the relay system to the, or another node of the communications network, the capability data indicating a one or more characteristics of the relay system. In some of these embodiments the capability data includes at least one of: an indication of a range of possible orientations that the second antenna of the relay system can be moved to using control data, the slew rate of the second antenna, indicative of the maximum rate of angular change that the second antenna can be moved by using control data, the spatial resolution of the second antenna, one or more frequency bands supported by the relay system, an identifier associated with the relay system to distinguish it from one or more other relay systems, or an indication of the power source type used by the relay system.

According to another embodiment of this aspect of the invention, there is the further step of sending to a node of the communications network a determination as to whether one or more relay systems associated with the base station is or are available for relaying signals between the base station and a particular mobile target object.

According to another embodiment of this aspect of the invention, there is the further step of receiving from the mobile target object for sending to the network node at least one of: position data, or waypoint data.

According to another embodiment of this aspect of the invention, there is the further step of sending status data to the network node responsive to receiving a request for said status data from the network node, wherein the received request for said status data comprises one or more single-bit flags in a predetermined order, indicative of one or more status parameters being requested from the network node.

According to another aspect of the invention there is provided a method for making a selection among relay systems having the steps of: communicating wirelessly with one or more associated relay control systems, each relay control system being associated with a relay system comprising a first antenna for substantially fixed orientation towards an antenna of the base station and a second antenna which is mechanically movable about one or more axes to provide one of a range of possible orientations; sending an identifier of an apparatus to a node of a communications network; and receiving in reply a determination as to whether one or more relay systems associated with the apparatus is or are available for relaying signals between the apparatus and a mobile target object.

According to another embodiment of this aspect of the invention, there is the further step of receiving broadcasting to the mobile target object, or causing broadcasting via the apparatus, a signal indicative of a positive or negative determination as to whether one or more relay systems are available. In some of these embodiments the broadcasting uses a Physical Broadcast Channel (PBCH) in which the positive or negative determination is reflected in a single bit attached to a PBCH message.

According to another embodiment of this aspect of the invention, there is the further step of sending status data to the network node responsive to receiving a request for said status data from the network node.

According to another embodiment of this aspect of the invention, there is the further step of receiving from the mobile target object for sending to the network node at least one of: position data, or waypoint data.

According to another embodiment of this aspect of the invention, there is the further step of receiving, from the network node, control data indicative of an orientation, or range of orientations to scan through, for each of the one or more available relay systems. In some of these embodiments there is the further step of initiating measurement indicative of a quality of service (QoS) between the second antenna of each of the one or more available relay systems and the mobile target object when at the orientation, or within the range of orientations indicated in the control data; and sending the QoS measurements for the or each available relay system to the network node.

According to another embodiment of this aspect of the invention, there is the further step of receiving selection of an optimal relay system from the network node and sending a further control signal to said selected optimal relay system for using said relay system to relay signals between the base station and the mobile target object.

According to another aspect of the invention there is provided a method for communicating with a mobile target object having the steps of: determining an availability of a plurality of relay systems associated with one or more base stations of a communications network; determining selection of one of the available relay systems as being optimal for relaying signals between a mobile target object and its associated base station based on one or more criteria; and transmitting control data to the selected relay system comprising at least positioning instructions for causing positioning of the second antenna to a particular orientation or range of orientations associated with the mobile target object.

In some of these embodiments of this aspect of the invention, availability is determined based on data received from the one or more base stations, and there is the further step of receiving a predetermined radius $\gamma_{BS}$ associated with the respective one or more base stations and indicative of a coverage area within which one or more available relay systems may be located.

In another embodiment of this aspect of the invention, there is the further step of receiving from the mobile target object for sending to the associated base station at least one of: position data, or waypoint data.

In another embodiment of this aspect of the invention, there is the further step of generating initial control data indicative of an orientation, or range of orientations to scan through, for each of the one or more available relay systems. In some of these embodiments there is the further step of initiating measurements indicative of a quality of service (QoS) between a movable antenna of each of the one or more available relay systems and the mobile target object when at the orientation, or within the range of orientations, indicated in the initial control data. In some of these embodiments there is the further step of determining the selection of one of the available relay systems as being optimal and the particular associated orientation based on the measurements.

BRIEF DESCRIPTION OF DRAWINGS

Example embodiments will now be described, by way of non-limiting example, with reference to the accompanying drawings, in which.

DETAILED DESCRIPTION

Figure 1:
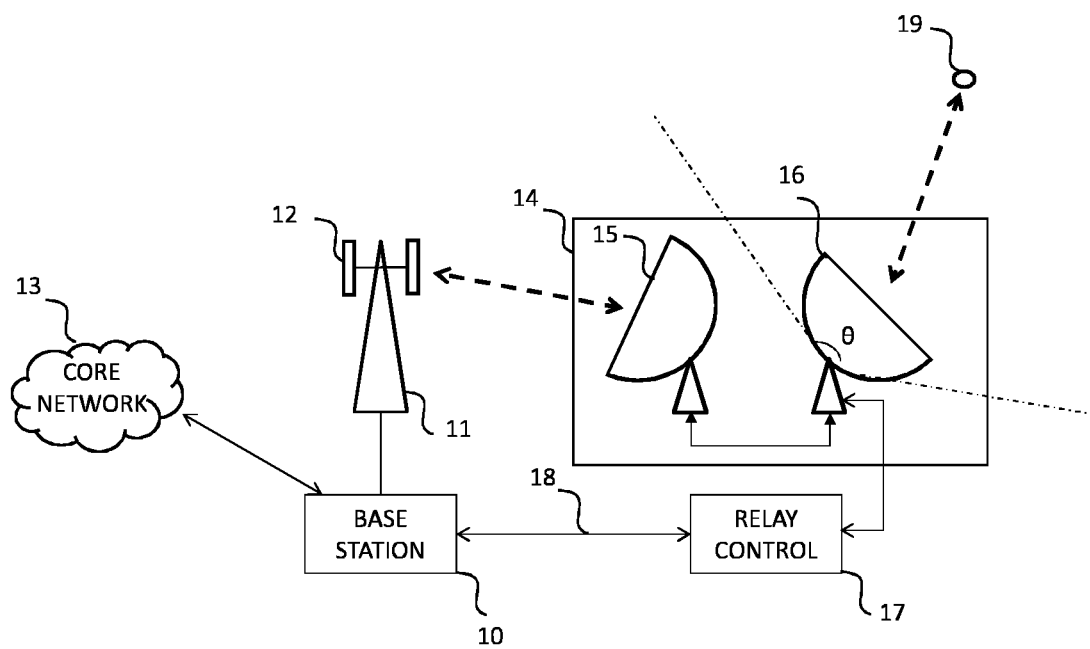
FIG. 1 is a block diagram of part of a telecommunications network comprising a base station having an associated relay system and relay controller according to example embodiments.

The following abbreviations may be referred to herein:
BS Base Station;
CQI Channel Quality Indicator;
DM-RS Demodulation Reference Signal;
eNB Enhanced NodeB;
gNB Next Generation NodeB;
GNSS Global Navigation Satellite System;
IRU Inertial Reference Unit;
LOS Line-Of-Sight;
LTE Long Term Evolution/4G;
NR New Radio;
PBCH Physical Broadcast Channel;
PDSCH Physical Downlink Shared Channel;
PRACH Physical Random Access Channel;
PRB Physical Resource Block;
PUSCH Physical Uplink Shared Channel;
QoS Quality of Service;
RSRP Reference Signal Received Power;
RTK Real-Time Kinematic;
SINR Signal-to-Interference plus Noise Ratio;
SRS Sounding Reference Signal;
SSB Synchronization Signal Block;
UAV Unmanned Aerial Vehicle;
UE User Equipment; and
5G $5^{th}$ Generation.

Example embodiments relate to communications with mobile objects and the relaying of communications with mobile objects. A mobile object is an object that is not usually fixed and which may change position. UAVs will be described herein as a particular example of mobile objects, but other examples may apply. Example embodiments may also relate to the use of one or more relay systems ("relays") for relaying signals between a ground station, e.g. a base station of a terrestrial communications system, and the one or more mobile objects. Example embodiments also relate to selecting or assigning a particular relay to a UAV and controlling an orientation or position of an antenna of said selected relay.

For ease of reference, the term base station (or "BS") will be used throughout this disclosure to refer to a ground station. Base stations usually have a known, fixed location and comprise a wireless communications transceiver, an associated antenna and a backhaul connection to a core network. Base stations and/or nodes of the core network may comprise processing functionality.

As mentioned, the use of UAVs is likely to increase so that they may become key enablers for future technologies and applications. UAVs require a communications link with a base station to transmit and receive payload data, for example sensor data from a camera and/or GNSS receiver in an uplink (UAV to base station) and control data in a downlink (base station to UAV) to determine their operation, flight path etc. Conventional communications networks, comprising base stations and core network infrastructure may satisfy such a need because of their ubiquity.

As UAVs move, signals with base stations may be suboptimal because base station antennas are generally optimized for ground-based user equipment (UEs) such as mobile telephones. The main lobe of such antennas generally points downwards whereas some mobile objects, such as UAVs, are often airborne and their position varies over time. UAVs often do not associate themselves with the closest base station because the main lobe of the closest base station is pointing downwards and away from the UAV. Consequently, there is an increased path loss in the communications link between the UAV and the base station. Antenna down-tilt also results in lower base station transmit/receive gain towards the UAV. In the uplink, the combined effect of increased path loss, as well as reduced base station antenna gain, results in decreased energy efficiency because a larger transmit power is needed for a given throughput. In the downlink, the effect may be lower received signal power. At higher altitudes, the UAV may have a line-of-sight to multiple base stations. Consequently, in the uplink, the UAV will cause considerable interference to ground UEs, exacerbated by the higher uplink transmit power. In the downlink, the UAV will receive interference from the side lobes of the base stations, increasing the total received interference power.

In example embodiments herein, the use of one or more relays is proposed to provide improved communications with mobile objects. Example embodiments may also relate to relay assignment and directional control for providing said improved communications.

A relay may comprise first and second antennas linked by cabling and possibly an amplifier. In some embodiments, the relay may comprise a passive reflector, which comprises first and second antennas and requires no amplifier.

Relays offer a low-cost solution to compensate for some issues raised above, including base station antenna down-tilt and providing coverage to UAVs, for example. Relays may also be compatible with existing networks and infrastructure. Example embodiments may involve methods for reducing the path loss in the uplink and the downlink. A particular antenna of the relay may be a directional antenna with high-gain and having a narrow beam-width for compensating for path losses.

The antenna, being directional, may require it to be movable, for example by means of a motorized mount to enable orientation towards the UAV responsive to control signals or data.

Consequently, where there is more than one relay (not necessarily associated with the same base station) there may be a need to select or assign the particular relay that is to be used. There may also the need to control the direction of the antenna to orient it towards the UAV.

Relay assignment cannot usually be performed by RSRP measurements, as in the case of initial access or handover for terrestrial UEs. This is because the initial relay assignments are arbitrary and the measured RSRP values, without orientating the relays in the direction of the UAV, will likely be incorrect. Example embodiments relate to relay selection, for example to satisfy a QoS criterion or criteria.

Regarding the relay, the first antenna may be configured in fixed orientation towards the base station antenna, or the main lobe, of a particular base station and the second antenna may be mechanically movable within a coordinate system using, for example, one or more motors under the control of any suitable control means such as a control module. The second antenna may, for example, be a parabolic dish that is oriented generally towards a spatial region in which target mobile objects are likely to be active. The second antenna may be a high-gain antenna with a narrow beam width. The second antenna may be mechanically movable so that the orientation may change in a controlled way based on where mobile objects are operating at a given time in order to serve a target mobile object. The second antenna may be pointed or oriented in the direction of the mobile object, e.g. UAV. In this way, in the downlink, interference may be limited to the narrow region covered by the width of the beam. In the uplink, the high gain allows the mobile object to transmit at a lower power, reducing interference to UEs on the ground and other mobile objects.

In an active relay, a high antenna gain results in a lower transmit power for the relay, which may lower the component cost and power consumption.

The range of orientations of the second antenna may be known or may be measured. For example, position information indicative of a target azimuth and elevation angle may be used to control the second antenna's orientation. The relay therefore provides a means by which signals between a mobile object and the base station can be relayed in one or both directions.

Advantages of using such relays include less path loss and improved gain between the mobile object and the base station. There is a reduced likelihood of adverse interference if the mobile object is at a high altitude whereby it has a line of sight (LOS) to multiple base stations; in such situations, higher transmit power in the uplink may interfere with ground-based UEs and in the downlink the mobile object may receive interference from side lobes of the base stations.

FIG. 1 shows part of a telecommunications network comprising a base station 10 having an associated antenna mast 11 and one or more antennas 12 mounted thereon. The base station 10 is connected to a core network 13 operated by a communications service provider. The base station 10 may be of any suitable type, and may utilize 3G, LTE, 5G or any future radio communications standard. For example, the base station 10 may be an enhanced NodeB (eNB) or a next generation NodeB (gNB).

A relay 14 is also provided for relaying signals between the base station 10 (via its antennas 12) and one or more UAVs 19. A relay 14 is sometimes referred to as a reflector, which typically needs no amplifier and can be a low cost device. The relay 14 may comprise a first antenna 15 and a second antenna 16. The first antenna 15 may be substantially fixed and oriented towards one or more of the base station antennas 12, for example in the direction of the main lobe of said one or more antennas. The second antenna 16 may be a movable antenna, which is an antenna that can be moved through a range of orientations based on a control signal. The control signal may be received from a relay control system 17 that may be part of the relay 14, or separate from the relay. The relay 14 can be a relatively simple, low-cost device that can be controlled from elsewhere in the shown network. The relay 14, as mentioned, can be a passive reflector.

The second antenna 16 may be, but is not necessarily, a parabolic antenna. A mechanism for changing the orientation of the second antenna 16 may comprise any suitable means, such as one or more solenoid stepper motors, each for moving the second antenna about a respective axis or coordinate system such as through a range of azimuth and elevation angles. Any coordinate system for defining a two or three-dimensional orientation may be employed.

A communications link 18 is provided between the base station 10 and the relay control system 17 for bidirectional communications. The communications link 18 may be wired or wireless. If wireless, the relay control system 17 may comprise an LTE/5G or other modem that communicates with the base station over existing cellular channels, for example using PDSCH, PBCH, or PDCCH channels for data from the base station to the relay control system and PUSCH, PRACH, or PUCCH channels for data in the other direction. In other embodiments, a wireless link may be established using WiFi (IEEE 802.11) or similar. Communication between the base station 10 and the core network 13 may be by means of the conventional backhaul infrastructure, which can also be wired or wireless.

Two types of informational data may be associated with the relay 14, namely capability data and status data. Capability data may reflect known or measured capabilities of the relay 14, and/or its second antenna 16, whereas status data may reflect data that may dynamically change over time.

For example, the second antenna 16 may have a limited range of orientations it can move to, e.g. due to the physical limitations of the motors or gearing employed to move the second antenna. The capability information may include data that reflects the range of azimuth and elevation angles through which the second antenna 16 can move. For example, one set of capability information may be the minimum and maximum azimuth and elevation angles.

Other capability information may comprise parameters or characteristics representing one or more of: the identity of the relay 14 (e.g. a unique identifier), slew rate, supported frequency bands, power source characteristics and spatial resolution.

The slew rate may be defined as a supported rate of angular change in the second antenna 16 direction; it may comprise the maximum rate. The slew rate may therefore determine the time taken for the second antenna 16 to move to a target orientation. The supported frequency bands may define which carrier frequencies and respective bandwidths the relay control system 17 supports, e.g. if communicating with a base station using a cellular or a WiFi link. The power source characteristics may define how the relay 14 is powered, e.g. mains, battery and/or by a renewable source such as solar or wind power. The spatial resolution may define the angular resolution of different orientations.

In summary, capability information may comprise data that reflects parameters or characteristics of the relay 14 and/or the second antenna 16 of said relay that may be useful by, for example, nodes such as the base station 10 or core network 13 in processing tasks to be described herein.

Examples of status data may comprise characteristics or parameters indicative of a current status of the relay 14 and/or second antenna 16. For example, different types of status data may comprise one or more of: the current orientation of the second antenna 16, current battery status (if battery powered, or powered by a renewable source) in terms of remaining energy or estimated time left; whether the relay 14 is available or busy (or other intermediate 'availability' statuses). Status data may also comprise the identity of the relay 14 (e.g. a unique identifier) which may be identical to that given in the capability data.

The capability and/or status data may be stored and maintained at the relay control system 17.

Figure 2:
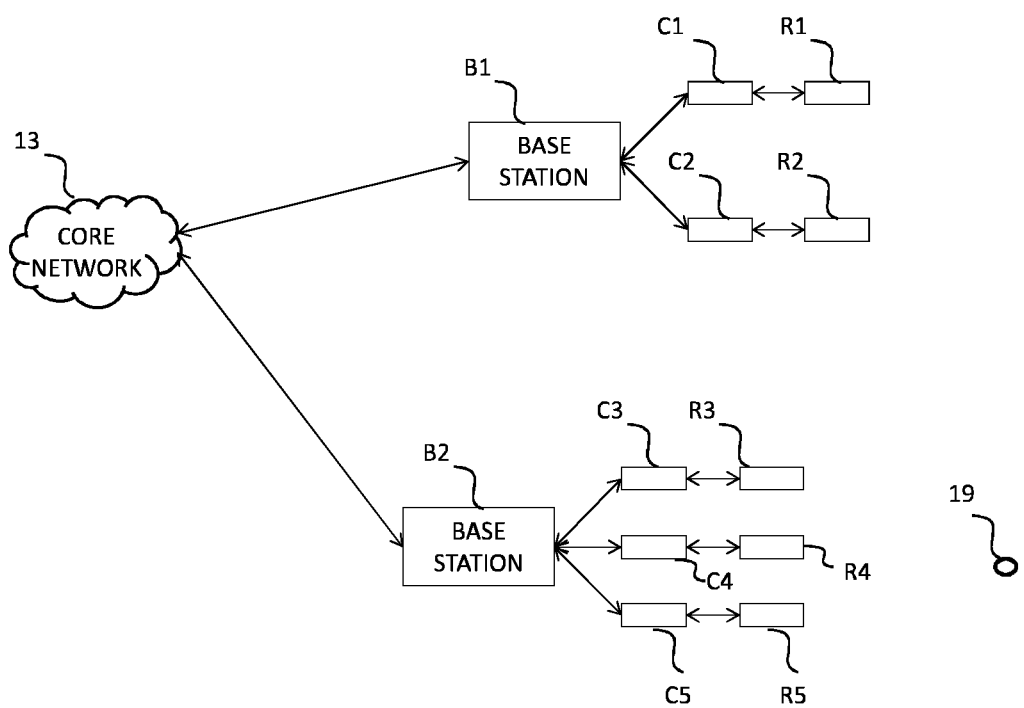
FIG. 2 is a block diagram showing schematically part of a telecommunications network comprising a plurality of base stations having multiple relay systems and relay controllers according to example embodiments.

Referring to FIG. 2, in some embodiments, there may be a plurality of base stations B1, B2 associated with the core network 13. Each base station B1 and B2 may have one or more relays associated therewith. In FIG. 2, relays R1-R2 are associated with base station B1 and relays R3-R5 are associated with base station B2. Typically, the relays R1-R5 will be within a certain radius of their associated base station B1, B2, each relay R1-R5 having a first antenna directed at a main lobe of its associated base station. Associations between base stations B1, B2 and relays R1-R5 may be stored in the core network 13 or in each particular base station B1, B2.

Each relay R1-R5 may have a respective relay control system C1-C5 although a single, common relay control system may serve two or more relays in some embodiments.

Since multiple relays are visible to the UAV 19 at high altitudes, it is possible that more than one relay R1-R5 may be available for relaying signals between a UAV 19 and a particular base station B1, B2 and also between the UAV 19 and the core network 13.

Selection of a particular base station—relay pairing for serving communications with the UAV 19 may therefore employ systems and methods to be described herein.

Signaling/Messaging

Signals that are transmitted and received between various components depicted in FIGS. 1 and 2 will now be described. In some embodiments, the signals may be provided in the form of messages, being discretely-generated messages transportable over a data network. Such messages may comprise multiple fields and may be standardized to meet the requirements of existing cellular communication standards. It should be appreciated that the embodiments described are not to be considered limiting and may omit certain elements and/or incorporate other elements.

Signaling/Messaging Between Base Station and Relay Control System

With reference to FIGS. 3A-3E, there will be described signaling that may be employed between a given base station 10 and a relay controller 17, referring to the communications system shown in FIG. 1.

In overview, the second antenna 16 of the relay 14 is controlled in terms of orientation by the relay control system 17, which can be part of, or separate from, the relay 14. There may be three types of signaling or messaging that take place between the base station 10 and its associated relay control system 17, using either wired or wireless communications:
 relay capability data;
 control signaling; and
 status data.

Figure 3:
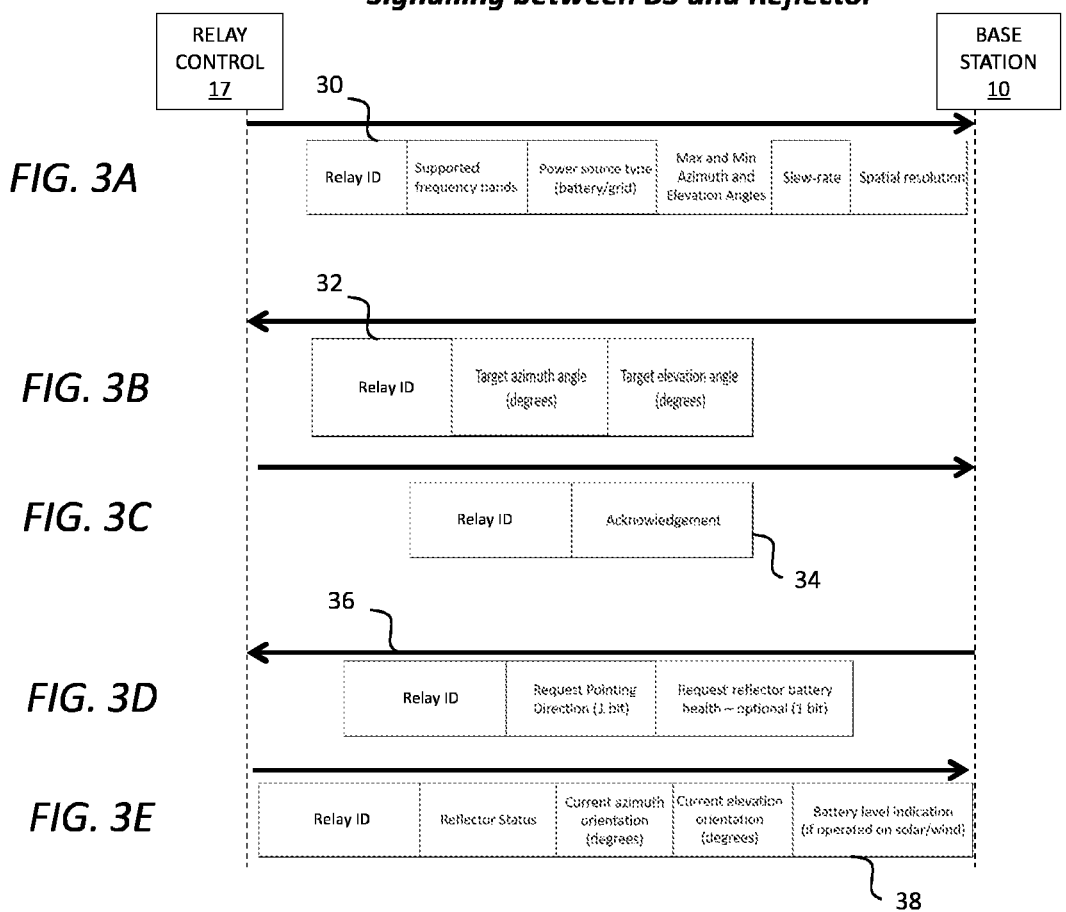
FIGS. 3A-3E are schematic views of respective signaling types that may be employed according to example embodiments.

FIG. 3A is an example message 30 for signaling capability data associated with the relay 14 from the relay control system 17 to the base station 10. The example message 30 may comprise one or more of the following capability characteristics or parameters in respective fields:

1) relay identifier—any data which enables the relay 14, and therefore its associated relay control system 17, to be uniquely identified in the context of the base station 10 and/or the core network 13 to which the base station is connected;
2) supported frequency bands—data indicating one or more frequency bands, e.g. in terms of carrier frequency and bandwidth, that are supported by the relay control system 17 if communicating with a base station using a cellular or WiFi link;
3) power source type—data defining the nature of the power source, e.g. mains/grid/battery/renewable source;
4) minimum and maximum azimuth and elevation angles—data defining the range of relay orientations that are supported; and
5) slew rate—data defining the maximum or average rate of change in orientation used to define parameters $\tau_n$ described later on;
6) spatial resolution—data defining the angular resolution of the second antenna 16, i.e. the different discrete positions it can move to.

FIG. 3B is an example message 32 for signaling control (or command) data from the base station 10 to the relay control system 17. The example message 32 may comprise one or more of the following information in respective fields:

1) relay identifier—any data which enables the relay 14, and therefore its associated relay control system 17, to be uniquely identified; this field will be needed, for example, if communication from the base station 10 to the relay control system 17 is over a wireless link, such as using the PBCH channel of a 3G/LTE/5G system, or if using WiFi, or if all relays are connected to the base station over a shared wired link such as Ethernet; in the case of a shared wired link, it may for example be an IP address.
2) target coordinate data—data that instructs the relay control system 17 where to orient the second antenna 16 towards; this data may comprise a combined field or separate fields defining, for example, a target azimuth angle and a target elevation angle. In other embodiments, the target coordinate data may have the format of "easting from north", or similar, and elevation. Any similar three-dimensional coordinate system can be used to define a target orientation.

FIG. 3C is an example message 34 for signaling an acknowledgment from the relay control system 17 to the base station 10 in response to receipt of the command or control data from the base station 10. The example message 34 may comprise the relay identifier and an acknowledgment field, flag or packet.

FIG. 3D is an example message 36 for signaling a status data request from the base station 10 to the relay control system 17. The example message 36 may comprise one or more of the following capability characteristics or parameters in respective fields:

1) relay identifier—any data which enables the relay 14, and therefore its associated relay control system 17, to be uniquely identified;
2) a pointing direction (orientation) request—this may comprise a single-bit field;
3) optionally, a battery health request—this may be applicable if the capability data indicated in FIG. 3A indicates that the particular relay 14 is battery powered, or uses renewable sources, and may comprise a single-bit field.

FIG. 3E is an example message 38 for signaling status data from the relay control system 17 to the base station 10 in reply to the status data request 36 described with reference to FIG. 3D. In some embodiments, the status data request 36 may specify one or more of the following parameters or characteristics to be returned. The example message 38 may comprise one or more of the following capability characteristics or parameters in respective fields:

1) relay identifier—any data which enables the relay 14, and therefore its associated relay control system 17, to be uniquely identified;
2) relay status—data representing the current status of the relay 14, e.g. available, ready, serving, moving, busy, not operational;

3) current orientation—data representing the current orientation of the second antenna 16; this data may comprise a combined field or separate fields defining, for example, a current azimuth angle and a current elevation angle. Any three-dimensional coordinate system can be used to define a current orientation;

4) battery level indication—if requested, data representing the current battery level in some way, such as the amount of energy remaining using some predefined scale and/or the expected time available based on current or expected usage.

Signaling/Messaging for Assignment of Relay

As indicated previously with reference to FIG. 2, it is possible that more than one relay R1-R5 may be available for relaying signals between a UAV 19 and a particular base station B1, B2. Selection of a particular base station B1, B2 and relay R1-R5 pairing for serving a UAV 19 may therefore employ signaling to be described here.

The serving base station may be that which is closest to the UAV 19 or may connect to the UAV 19 using a side lobe. The serving base station may for example be a base station having the maximum RSRP/SINR or other QoS parameter. As mentioned earlier, the UAV 19 does not necessarily associate itself with the closest base station at high altitudes. As an example, it is assumed for the remainder of the specification that the UAV 19 has associated itself with base station B1 even though it is in closer proximity to base station B2 (as also depicted in FIG. 2). Therefore, base station B1 is then referred to as the serving base station. Furthermore, as an example, for the remainder of the specification, relays R1-R4 are assumed available and R5 is assumed to be unavailable.

Figure 4:
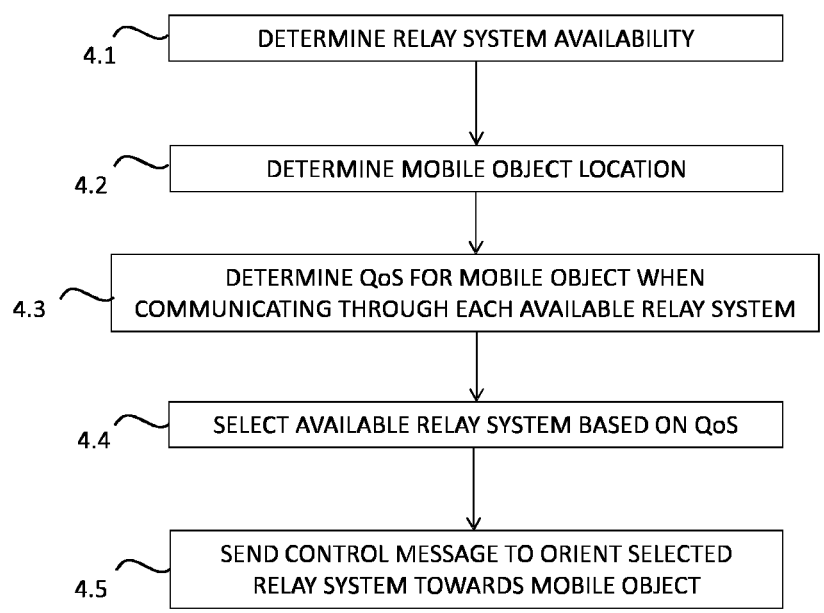
FIG. 4 is a flow diagram showing operations that may be performed according to example embodiments.

Referring first to FIG. 4, a general method according to an example embodiment is shown as a flow diagram. The method may be performed in a network node of the communications system, e.g. at a processing system within a node of the core network or at a base station B1, B2.

A first operation 4.1 may comprise determining relay availability. This may be by means of signaling a status data request message 36 (see FIG. 3D) and receiving status data back, e.g. the message 38 shown in FIG. 3E.

A second operation 4.2 may comprise determining the location of a mobile object, e.g. a UAV 19.

A third operation 4.3 may comprise determining a quality of service (QoS indicator for the mobile object when communicating through each of the available relays.

A fourth operation 4.4 may comprise selecting an available relay based on the QoS determined in operation 4.3.

A fifth operation 4.5 may comprise sending a control message to orient the selected relay towards the mobile object. This may be by means of signaling a status data request message 36 (see FIG. 3D) and receiving status data back, e.g. the message 38 shown in FIG. 3E.

Pre-requisites for the FIG. 4 method may include that the mobile object, e.g. UAV 19, as will be the example used in the remainder of the specification, has access to the communications network, e.g. it carries an LTE/5G or other modem and is registered to the network. Also, in the case of flying UAVs, a pre-requisite may be that the UAV 19 supports aerial functionality, for example subscription-based aerial user equipment identification and authorization as specified in 3GPP TS 23.401, v.15.4.0.

Regarding the first and second operations 4.1, 4.2, the UAV 19, or a serving base station B1, may trigger determination of the UAV's location. In the case where the UAV 19 triggers location reporting, the serving base station B1 may transmit or broadcast information corresponding to the available relays R1-R2 within a predetermined radius $\gamma_{BS}$ of the base station's location. If the radius $\gamma_{BS}$ is large enough to encompass other relays of a different base station, for example those of the other base station B2, the serving base station B1 may broadcast information corresponding to those other relays R3-R4, in addition to its own. If one or more relays R1-R5 are available, the UAV 19 may monitor a parameter of interest, such as one or more of its current altitude, and the path loss, RSRP, SINR, CQI or other equivalent QoS parameter between it and the serving base station B1 and may transmit location information if the monitored parameter of interest crosses a predetermined threshold. The availability of one of the relays R1-R5 may be based on the status response message 38 indicated in FIG. 3E or the knowledge at the base stations B1, B2 or the core network 13 that the relay has not been assigned to another UAV. Alternatively, in the case where the network (e.g. the serving base station B1) triggers location reporting, the serving base station B1 determines whether there are available relays within a predetermined radius $\gamma_{BS}$ around it, which may include relays R3-R5 of a different base station B2. If there are available relays, e.g. R1-R4, the serving base station B1 may request the location and waypoint information from the UAV 19 based on 3GPP TS 36.300 v15.2.0, if for example one or more of the path loss, RSRP, SINR, CQI parameter(s) crosses the predetermined threshold.

The location information may be transmitted, for example, if the altitude goes above a threshold, or, if a QoS parameter, such as RSRP/CQI/SINR, is being monitored, the location information may be transmitted if one or more of these parameters goes below the threshold. Location information may be determined using any conventional means, such as using GNSS and/or cellular network—based positioning. Also, in some embodiments, the serving base station B1 may request waypoints for the UAV 19 in addition to its location. Waypoints may comprise a number of three-dimensional locations representing a flight path, possibly including timestamps. Waypoint information may be accessible from the UAV 19, some other system that stores its flight plan, or may be predicted based on a learned model. Location and waypoint signaling may be based on 3GPP TS 36.300 v15.2.0, for example.

Regarding the third operation 4.3, the UAV location obtained in the second operation 4.2 may be used to define a set of candidate azimuth and elevation angles for the path loss, RSRP, SINR and/or CQI parameter measurement for each available relay in a set which is referred to as R below.

We may define:
- $\tau_n$ as the time required for an available relay n to change its orientation towards the UAV 19;
- $\tau_{max}$ as the maximum allowed time for the relays to orient towards the UAV 19;
- R={r1, ..., $r_{NR}$} to represent a set of $N_R$ relays at a predefined radius $\gamma_R$ around the UAV location with $\tau_n \leq \tau_{max}$ as determined in operation 4.2;
- $\theta_n$ as the estimated elevation angle at a relay n when pointing to the UAV 19;
- $\emptyset_n$ as the corresponding azimuth angle;
- Δ as the predefined confidence interval on the azimuth/elevation angles, from the relay to the mobile object or a target UAV 19. Δ may be the maximum error in the estimated angles and may be dependent on localization error intervals, reported by conventional localization algorithms;
- $X_n$ as the range of azimuth and elevation angles of a relay n around the estimated angles $\theta_n$ and $\emptyset_n$. Note that $X_n$ may be constrained by the physical limitations of the relay, defined by angles $\theta_{min}$, $\theta_{max}$, $\varnothing_{min}$, $\varnothing_{max}$.
The precise definition of $X_n$ may be given as:

$$X_n=\{(\theta,\varnothing):\theta_{lo}\leq\theta\leq\theta_{hi},\varnothing_{lo}\leq\varnothing\leq\varnothing_{hi}\},$$

where $\theta_{lo}=\max(\theta_{min},\theta_n-\Delta),\theta_{hi}=\min(\theta_{max},\theta_n+\Delta)$,
$\varnothing_{lo}=\max(\varnothing_{min},\varnothing_n-\Delta),\varnothing_{hi}=\min(\varnothing_{max},\varnothing_n+\Delta)$ Measurement of RSRP/SINR/CQI parameter(s) may be performed using the uplink or the downlink paths. In the case of the uplink, the one or more base stations B1, B2 for which there are available relays R1-R4 may assign one or more Physical Resource Blocks (PRBs) for measurement. We will assume that only the relays R1-R4 are considered available. The UAV 19 may transmit a reference signal, e.g. DM-RS over the assigned PRBs over the PUSCH channel. The UAV 19 may also transmit an SRS signal. During said transmission, all available relays R1-R4 in the set R may perform a simultaneous raster scan through their respective angular ranges $X_n$. For each orientation of each relay R1-R4, the base station associated with that relay will measure one or more of the path loss, RSRP, SINR and CQI. If other relays associated with one or more other base stations B2 are within the predetermined radius $\gamma_R$, measurements may take place simultaneously across multiple base stations, e.g. B1, B2. The measured one or more of the path loss, RSRP, SINR and CQI parameters are reported to the serving base station B1, along with the corresponding coordinates, e.g. azimuth and elevation angles of each relay R1-R4. These may also be reported to the core network 13. The DM-RS and/or RSS signals/symbols may be transmitted for the duration of the raster scan. For example, for each relay orientation, one symbol may be transmitted and the total number of symbols may equate to the number of possible relay orientations in $X_n$.

In the case of the downlink, the base stations B1, B2 may assign a unique PRB for measurement. The base station B2 may then transmit a reference signal over the assigned PRBs over, for example, PDSCH, PBCH or SSB. During transmission, all relays in the set R may perform a simultaneous raster scan through their respective angular ranges. For each orientation of each relay in set R, the UAV 19 may measure one or more of the path loss, RSRP, SINR and CQI. Similar to the case of the uplink, the measured one or more of the path loss, RSRP, SINR and CQI parameters are reported to the serving base station B1, and possibly to the core network 13, along with the corresponding coordinates, e.g. azimuth and elevation angles of each relay R1-R4. In addition, as in the case of uplink, PRBs may be transmitted for the duration of the raster scan. For example, for each relay orientation, one symbol may be transmitted and the total number of symbols may equate to the number of possible relay orientations in $X_n$.

As another option, in either uplink and downlink, one or more of the returned path loss, RSRP, SINR and CQI may be predicted and reported based on previous measurements or theoretical models.

Regarding the fourth operation 4.4, the QoS parameters such as path loss, RSRP, SINR and/or CQI may be used to select a base station-relay pair. One or more optimization algorithms may be performed. For example, the selection may be based only on the current location of the UAV 19 and disregarding any waypoint information. Then, the base station-relay pair that maximizes a QoS criterion or criteria is selected. Another option is to take waypoint information into account. In this option, measured and predicted QoS parameters are taken into account. For example, an optimal base station-relay pair may be defined as that which minimizes the number of eventual handovers. Factors such as the battery health of relays (if powered by a battery or a renewable source) may be used in the selection algorithm, with those relays which fall beneath/exceed a predetermined threshold being disregarded from selection. In some embodiments, the current orientation of the second antennas 16 of each relay R1-R5 may be taken into account. Relays R1-R5 whereby the slew rate of the second antenna 16 is smaller than a predetermined threshold may be disregarded from selection.

Regarding the fifth operation 4.5, the selected relay is assigned to the UAV 19, and a control signal sent to the relay control system of the corresponding relay. If the FIG. 4 method is performed at a node of the core network, the control signal or message is sent to the corresponding base station B1, B2, which in turn sends the control signal, or a signal derived therefrom, to the relay control system over the wired or wireless link.

In some embodiments, a selected relay may be used for a single UAV 19. The other, unused relays, may be set to a "rest position" so that they do not reflect undesired signal from the base station B1, B2 to the UAV 19.

The signaling formats for communications between the core network node and the base station may be standardized to enable the proposed relay assignment method of FIG. 4. These messages are exemplary describing the general principles—the exact naming, bit field lengths, etc., may be adapted to particular standards where this kind of support would be added.

There may, for example, be provided a standardized signaling format allowing the serving base station B1 to obtain relay availability information from the core network 13 based on the location of the serving base station. This signaling may be required if the UAV 19 triggers the relay assignment. The serving base station B1 may need to obtain from the core network 13 the set of available relays R1-R5 within the pre-determined radius of $\gamma_{BS}$.

Example 1. serving base station→core network: [BS-ID, gamma_BS]
2. core network→serving base station: [BS-ID_n, R-ID_{n,1}, . . . , R-ID_{n,r}, X_{n,r}], n=1, . . . N, r=1, . . . R;

There may, for example, be provided signaling allowing the serving base station B1 to broadcast relay availability. This signaling may be required if the UAV 19 triggers the relay assignment. The serving base station B1 may broadcast relay availability and capability data to the UAV 19 over, for example, the PBCH channel. This may necessitate a new bit in the PBCH channel for binary indication of relay availability in network. For example:

0='No available relays' which may involve an empty relay identifier set being returned by the core network in a previous step;
1='Relays available' which may involve at least one relay ID being returned by core network in previous step;

There may, for example, be provided signaling allowing the core network 13 to retrieve status information about the relays. This signaling may be required when the core network 13 wants to take relay status information (such as orientation, relay capabilities, battery health etc.) into account when selecting the relay. This signaling may comprise the following fields:

1. core network→associated base station: [R-ID, RQ-R-orientation, RQ-R-batt];
2. associated base station→core network: [R-ID, R-orientation, R-batt].

RQ-R-orientation may be a 1-bit flag to request relay orientation, for example:
  0=do not send orientation of relay 'R-ID' (returned R-orientation is null)
  1=send orientation of relay 'R-ID' (R-orientation contains current orientation of relay 'R-ID')

RQ-R-batt may be a 1-bit flag to request relay battery health, for example:
  0=do not send battery health of relay 'R-ID' (returned R-batt is null)
  1=send battery health of relay 'R-ID' (R-batt contains battery health of relay 'R-ID')

There may, for example, be provided signaling allowing the core network 13 to transfer the candidate azimuth/elevation angle ranges to the corresponding base station-relay pairs, i.e., transfer $X_n$ to base station-relay pair n.

This may comprise signaling required in operation 4.3 to instruct each base station-relay pair of the angular ranges that it should scan through for estimating the QoS parameter or parameters. For example:
  core network→BS n in R: [min_azim_n, max_azim_n, min_elev_n, max_elev_n]
where min_azim_n is the minimum azimuth angle in $X_n$, and so on for max_azim_n, min_elev_n, and max_elev_n.

There may, for example, be provided signaling allowing the core network 13 to coordinate QoS measurement across several base station-relay pairs. The overhead for assignment may be a minimum when the QoS parameters of all the base station-relay pairs involved in the selection are measured simultaneously. This may require coordination between base stations which may be provided by the core network 13. For example:
  core network→BS n in R: [Measurement_Idx_Start, Measurement_Idx_Stop]
where Measurement_Idx_Start/Measurement_Idx_Stop are indices of OFDM symbols for starting and stopping measurement, respectively.

There may, for example, be provided signaling allowing the core network 13 to convey the 'optimal' orientation to the selected base station-relay pair. This signaling may be required to enable operation 4.5, once the optimal base station-relay pair has been selected by the core network.
  core network→selected base station: [azim_angle, elev_angle]
where azim_angle/elev_angle are the azimuth and elevation angles, respectively.

In summary, there has been described a system for utilizing in a communications infrastructure, such as that shown in FIGS. 1 and 2, one or more relays R1-R5 for relaying communications between base stations B1, B2 and mobile objects, such as UAVs 19. To facilitate this, signaling has been described to handle control of a second, movable antenna 16 of such relays to orient it to a particular direction associated with the mobile object. For example, signaling between the relay control system and its associated base station, may include the following:
  messaging comprising information on relay capability;
  control messaging that allows the base station to point the second antenna of a relay in a certain direction or orientation;
  status request messaging where the base station requests the current status of the relay.

Further, there may be provided:
  signaling allowing the serving base station to obtain relay availability information from the core network based on location of serving base station;
  signaling allowing the serving base station to broadcast relay availability;
  signaling allowing the core network to retrieve status information about the relays;
  signaling allowing the core network to transfer the candidate azimuth/elevation angle ranges to the corresponding BS-relay pairs, i.e., transfer $X_n$ to base station-relay pair n;
  signaling allowing the core network to coordinate training across several base station-relay pairs;
  signaling that will enable the core-network to convey the 'optimal' orientation to the selected base station-relay pair.

Figure 5:
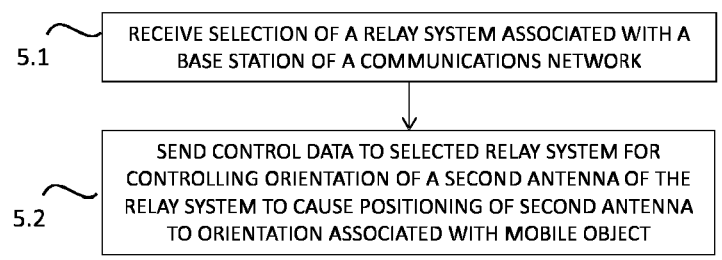
FIG. 5 is a flow diagram showing operations that may be performed according to example embodiments.

FIG. 5 is a flow diagram showing processing operations that may be performed by an apparatus according to some example embodiments.

A first operation 5.1 may comprise receiving selection of a relay system associated with a base station of a communications network. The relay system may comprise a first antenna for substantially fixed orientation towards an antenna of the base station and a second antenna which is mechanically movable about one or more axes responsive to the control data to provide one of a range of possible orientations.

A second operation 5.2 may comprise sending control data to the selected relay system for controlling the orientation of the second antenna, the control data comprising at least positioning instructions received from a node of the communications network for causing positioning of the second antenna to a particular orientation associated with a mobile object.

Figure 6:
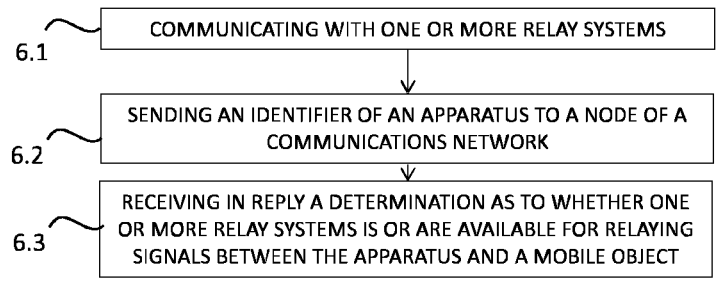
FIG. 6 is a flow diagram showing operations that may be performed according to example embodiments.

FIG. 6 is a flow diagram showing processing operations that may be performed by an apparatus according to some example embodiments.

A first operation 6.1 may comprise communicating (wirelessly and/or through a wired connection) with one or more associated relay systems. The or each relay system may comprise a first antenna for substantially fixed orientation towards an antenna of the base station and a second antenna which is mechanically movable about one or more axes to provide one of a range of possible orientations.

A second operation 6.2 may comprise sending an identifier of the apparatus to a node of a communications network.

A third operation 6.3 may comprise receiving in reply a determination as to whether one or more relay systems associated with the apparatus is or are available for relaying signals between, i.e. to and/or from, the apparatus and a mobile target object.

Other operations may be added or may replace operations shown in FIGS. 4-6, including those set-out in the description and appended claims.

Figure 7:
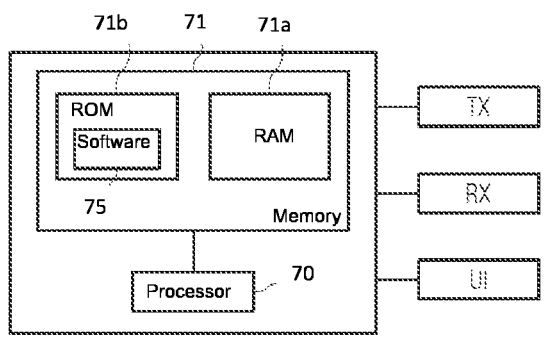
FIG. 7 is a block diagram of an apparatus that may be configured or programmed to operate in accordance with the FIG. 4-6 operating instructions.

FIG. 7 shows an apparatus according to an embodiment. The apparatus may be configured to perform the operations described herein, for example operations described with reference to any preceding process. The apparatus may comprise, for example, part of the relay control system 17, part of the base station 10 or a part of the core network 13. The apparatus comprises at least one processor 70 and at least one memory 71 directly or closely connected to the processor. The memory 71 includes at least one random access memory (RAM) 71a and at least one read-only memory (ROM) 71*b*. Computer program code (software) 75 is stored in the ROM 71*b*. The apparatus may be connected to a TX path and a RX path of a base station or a UAV in order to obtain respective signals. However, in some embodiments, the TX signals and RX signals are input as data streams into the apparatus. The apparatus may be connected with a user interface (UI) for instructing the apparatus and/or for outputting results. However, instead of by a UI, the instructions may be input e.g. from a batch file, and the output may be stored in a non-volatile memory. The at least one processor 70, with the at least one memory 71 and the computer program code 75 are arranged to cause the apparatus to at least perform at least the method according to any preceding process.

Figure 8:
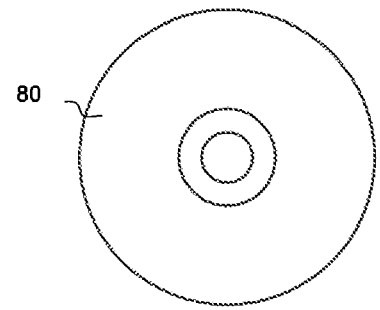
FIG. 8 is a non-transitory media that may comprise computer-readable code for operating according to example embodiments.

FIG. 8 shows a non-transitory media 80 according to some embodiments. The non-transitory media 80 is a computer readable storage medium. It may be e.g. a CD, a DVD, a USB stick, a blue ray disk, etc. The non-transitory media 80 stores computer program code causing an apparatus to perform the method of any preceding process.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, an eNB, gNB a WiFi access point etc.

A memory may be volatile or non-volatile. It may be e.g. a RAM, a SRAM, a flash memory, a FPGA block ram, a DCD, a CD, a USB stick, and a blue ray disk. If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. A method for communicating with a mobile target object comprising:
   receiving selection of a relay system associated with a down-tilted antenna of a base station of a communications network, the relay system comprising:
      a first ground-based antenna having a substantially fixed orientation towards the down-tilted antenna of the base station and
      a second ground-based antenna which is mechanically movable about one or more axes responsive to control data to provide one of a range of possible orientations;
   sending control data to the selected relay system for controlling the orientation of the second ground-based antenna, the control data comprising:
      at least positioning instructions received from a node of the communications network for causing positioning of the second ground-based antenna to a particular orientation associated with a mobile target object; and
   sending capability data received from the relay system to the, or another node of, the communications network, the capability data indicating a one or more characteristics of the relay system,
   wherein the capability data includes a slew rate of the second ground-based antenna, indicative of the maximum rate of angular change that the second antenna can be moved by using control data.

2. The method of claim 1, wherein the positioning instructions comprise or resolve to azimuth and elevation angles.

3. The method of claim 1, further comprising:
   sending status data received from the relay system to the, or another node of the communications network,
   the status data indicating a one or more status parameters of the relay system indicative of whether the relay system is available to relay signals between the base station and the mobile target object.

4. The method of claim 3, wherein the status parameters include at least one of an indication as to whether the relay system is currently busy or available, a current orientation of the second ground-based antenna, or a power status of the relay system.

5. The method of claim 1, further comprising:
   sending to a node of the communications network a determination as to whether one or more relay systems associated with the ground-based base station is or are available for relaying signals between the base station and a particular mobile target object.

6. The method of claim 1, further comprising:
   receiving from the mobile target object for sending to the node of the communications network at least one of: position data, and waypoint data.

7. The method of claim 1, further comprising:
   sending status data to the node of the communications network responsive to receiving a request for said status data from the node of the communications network,
   wherein the received request for said status data comprises one or more single-bit flags in a predetermined order, indicative of one or more status parameters being requested from the node of the communications network.

8. A method for making a selection among relay systems comprising:
   communicating wirelessly between a down-tilted antenna of a base station and one or more associated relay control systems, each relay control system being associated with a corresponding relay system comprising:
      a first ground-based antenna having a substantially fixed orientation towards the down-tilted antenna of the base station and
      a second ground-based antenna which is mechanically movable about one or more axes to provide one of a range of possible orientations;

sending an identifier of a first one of the one or more relay control systems to a node of a communications network;

receiving in reply a determination as to whether a first one of the one or more relay systems associated with the first one of the one or more relay control systems is available for relaying signals between the first one of the one or more relay control systems and a mobile target object; and sending capability data received from at least one of the one or more relay control systems to the node of the communications network, the capability data indicating a one or more characteristics of the relay system, wherein the capability data includes a slew rate of the second ground-based antenna, indicative of the maximum rate of angular change that the second antenna can be moved by using control data.

9. The method of claim 8, further comprising:

broadcasting to the mobile target object, or causing broadcasting via the first one of the one or more relay systems, a signal indicative of a positive or negative determination as to whether one or more relay systems are available.

10. The method of claim 9, wherein broadcasting uses a Physical Broadcast Channel (PBCH) in which the positive or negative determination is reflected in a single bit attached to a PBCH message.

11. The method of claim 8, further comprising:

sending status data to the node of the communications network responsive to receiving a request for said status data from the node of the communications network.

12. The method of claim 8, further comprising:

receiving from the mobile target object, for sending to the node of the communications network, at least one of position data and waypoint data.

13. The method of claim 8, further comprising:

receiving, from the node of the communications network, control data indicative of an orientation, or range of orientations, to scan through for each of the one or more available relay systems.

14. The method of claim 13, further comprising:

initiating measurement indicative of a quality of service (QoS) between the second ground-based antenna of each of the one or more available relay systems and the mobile target object when at the orientation, or within the range of orientations indicated in the control data; and sending the QoS measurements for the or each available relay system to the node of the communications network.

15. The method of claim 8, further comprising:

receiving selection of an optimal relay system from the node of the communications network and sending a further control signal to said selected optimal relay system for using said relay system to relay signals between the down-tilted antenna of the base station and the mobile target object.

16. A method for communicating with a mobile target object comprising:

determining an availability of a plurality of ground-based relay systems associated with one or more base stations of a communications network;

determining selection of one of the available ground-based relay systems as being optimal for relaying signals between a mobile target object and a first base station, of the one or more base stations, based on one or more criteria;

transmitting control data to the selected ground-based relay system, the control data comprising at least positioning instructions for causing positioning of a movable antenna of the selected ground-based relay system to a particular orientation or range of orientations associated with the mobile target object; and sending capability data received from the relay system to a node of the communications network, the capability data indicating a one or more characteristics of the relay system, wherein the capability data includes a slew rate of the second ground-based antenna, indicative of the maximum rate of angular change that the second antenna can be moved by using control data.

17. The method of claim 16, wherein availability is determined based on data received from the one or more base stations, and further comprising:

receiving a predetermined radius $\gamma_{BS}$ associated with the respective one or more base stations and indicative of a coverage area within which one or more available ground-based relay systems may be located.

18. The method of claim 16, further comprising:

receiving from the mobile target object for sending to the associated base station at least one of position data, and waypoint data.

19. The method of claim 16, further comprising:

generating initial control data indicative of an orientation, or range of orientations, to scan through for each of the one or more available ground-based relay systems.

20. The method of claim 19, further comprising:

initiating measurements indicative of a quality of service (QoS) between a movable antenna of each of the one or more available ground-based relay systems and the mobile target object when at the orientation, or within the range of orientations, indicated in the initial control data.

21. The method of claim 20, wherein determining the selection of one of the available ground-based relay systems as being optimal is based on the measurements indicative of the QoS.

* * * * *